June 8, 1954

A. E. WRIGHT 2,680,588

FLAGSTAFF HOLDER

Filed Jan. 8, 1951

Aubern E. Wright
INVENTOR.

BY
*Clarence A. O'Brien*
*and Harvey B. Jacobson*
Attorneys

Patented June 8, 1954

2,680,588

UNITED STATES PATENT OFFICE 2,680,588

FLAGSTAFF HOLDER

Aubern E. Wright, Nappanee, Ind.

Application January 8, 1951, Serial No. 204,912

4 Claims. (Cl. 248—226)

This invention comprises novel and useful improvements in a flagstaff holder and more specifically pertains to a device for releasably securing a flagstaff to a portion of an automobile or similar vehicle and being particularly adaptable on funeral cars.

A primary object of this invention is to provide a flagstaff holder which has a means for embracing a portion of an automobile whereby the holder will not rattle nor fall from the auto.

Another object of this invention is to provide a flagstaff holder which is adapted to be secured on the window frame of an automobile.

Other objects of this invention are to provide a flagstaff holder which is simple in construction, light in weight, efficient in operation and inexpensive to manufacture.

These, together with various ancillary features and objects of the invention, which will later become apparent as the following description proceeds, are attained by the present invention, a preferred embodiment of which is illustrated, by way of example only, in the accompanying drawings, wherein.

With attention now being directed to the accompanying drawings, wherein like numerals designate similar parts throughout the various views, it will be noted that the numeral 10 denotes a portion of an automobile having a front door 12 provided with the customary window pane 14 upwardly slidable in the recessed frame.

Figure 1:
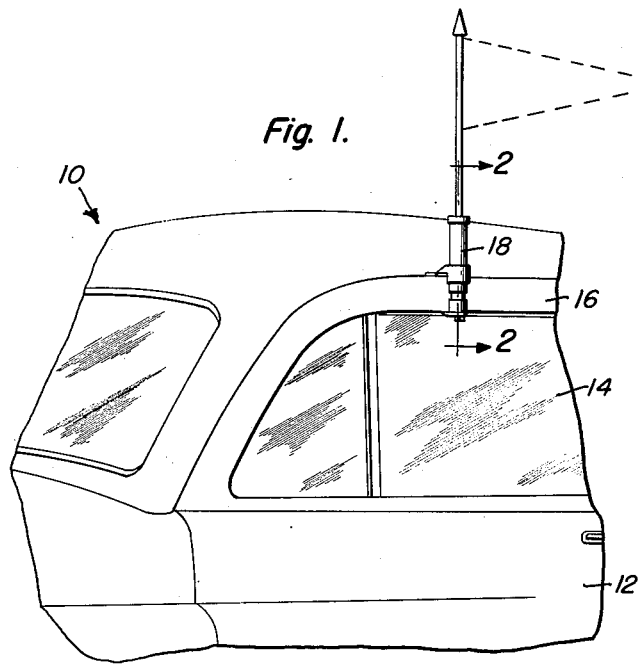
Figure 1 is a perspective view illustrating the application of the present device to the window frame of an automobile.

In the past, it has been the practice to secure flag holders to the fender, bumpers or similar parts of an automobile. This was found to be undesirable since many holders mounted in this manner were lost due to their continual tendency to become loosened in such locations. A further disadvantage to this prior practice was that mud, water, dirt and the like could easily splatter and gather on the working parts of the holder, thereby decreasing their efficiency. For disclosure of one of these bumper mounted holders, reference is made to the patent to F. S. Schmid et al., No. 2,067,024. To alleviate these difficulties, the instant invention has arranged a novel device for attaching a flagstaff holder to the frame of the door adjacent the window, as seen in Figure 1.

The holder, generally indicated at 18, consists of an inner cylindrical sleeve 20, preferably constructed of a metallic material and having a closed base or bottom 22. The flagstaff itself may comprise a rod 24 extending through the base 22 and being secured thereto in a manner subsequently to be described. This rod is concentric with the inner sleeve 20 and rises upwardly and out of said sleeve, serving either as the flagstaff itself, as previously mentioned, or as a member to which the flagstaff may be attached.

An outer sleeve 26 slidably engages the inner sleeve 20 in a telescoping fashion, having an open bottom and the top enclosed by a cap 28. Secured to the cap by any suitable fastener 30, is a helical spring 32 spiralling downwardly around the rod 24 and being secured at its lower end in a slot in the rod, as at 34. It is thus seen that the outer sleeve 26 is yieldingly urged to a downward position of alignment with the inner sleeve 20 by means of the spring 32. However, to provide a limit when stretching the sleeves apart, a detent 36 is struck in the outer sleeve sliding within the slot 38 in the inner sleeve and engaging the abutment 40 at the upper limiting position.

The foregoing portion of the invention provides an operating mechanism whereby a clamping action may be realized. Upper and lower clamps 42 and 44 are therefore respectively secured to the outer and inner sleeves 26 and 20. Since these clamps are adapted for use with the window and door frame of an automobile, description of these elements should be developed collaterally. Accordingly, the upper clamp 42 has a substantially semi-cylindrical sleeve portion 46 tightly secured at a suitable position on the lower end of the outer sleeve 26. Integrally and tangentially extending from the upper portion of the sleeve 46 are a pair of substantially triangular shaped bracket arms 48. Depending from the arms is an L-shaped jaw 50.

Figure 2:
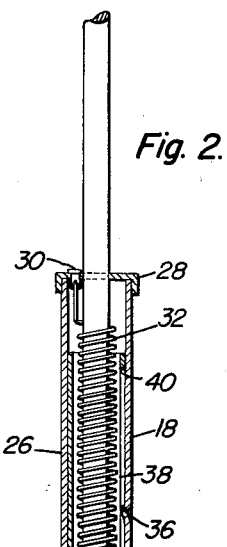
Figure 2 is a vertical sectional view taken substantially on the plane of the section lines 2—2 of Figure 1.
Figure 5:
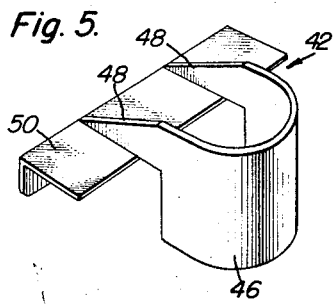
Figure 5 is a perspective view illustrating the construction of the upper clamp, a portion of the present invention.
Figure 3:
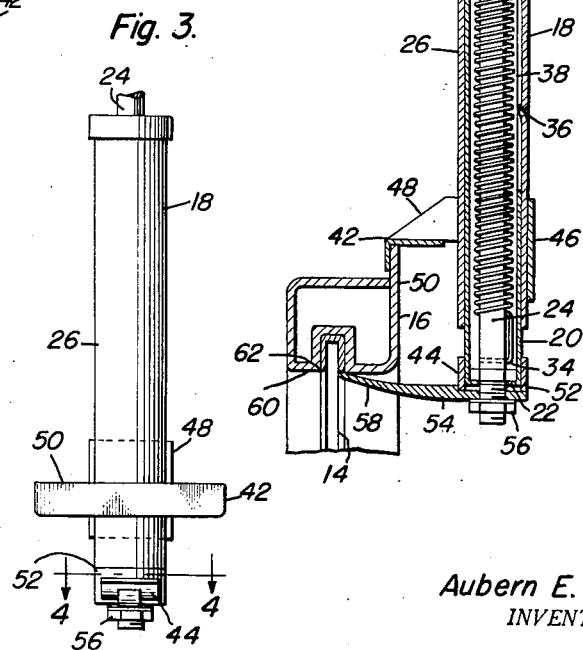
Figure 3 is a front vertical view, illustrating in particular the clamping device in the present invention.
Figure 4:
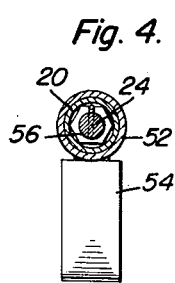
Figure 4 is a horizontal sectional view taken substantially along the plane of the section lines 4—4 of Figure 3.

As seen in Figure 2, a portion 52 of the frame 16, as in the conventional construction, extends vertically upward whereby in closing the door, this portion 52 will abut against the rim, not shown, which depends along the edge of the roof. The L-shaped jaw is constructed to fit over this extended portion 50 so as to fit snugly between the rim, not shown, and the inner surface of the portion 50.

A lower clamp 44 consists of a short cylindrical sleeve 52 receiving the base 22 of the sleeve 20 therein being seated in the lower jaw 54. As previously mentioned, the rod extends through the base 22 and further, as in Figure 2, is seen to extend through the rear of the jaw 54. The end of the rod is threaded and nuts 56 are provided to tightly connect the rod, inner sleeve and lower clamp together.

The lower jaw 54 is substantially horizontal for about one-half of its protrusion and from thereon bends arcuately upwardly, as at 58. The arcuate portion 58 is adapted to be received between the underside 60 of the frame and the upper edge of the window 14 while bridging the recess 62 in the frame. If the window is rolled up tightly against the jaw 54 and the jaw is closed thereby securing the jaw 48, it is believed readily apparent that the flagstaff will be securely attached to the automobile.

From the foregoing, it is felt that the operation of the invention and the manner of construction of the same will be readily apparent. After a consideration of the foregoing specification and drawings, accordingly, further explanation is believed to be unnecessary.

Since various changes will readily occur to those skilled in the art after consideration of the foregoing drawings and specification, it is not intended to limit the invention to the exact construction shown and described, but all suitable equivalents and modifications may be resorted to, falling within the scope of the appended claims.

Having described the invention, what is claimed as new is:

1. A flagstaff holder for attachment to an automobile door comprising an inner sleeve having an enclosed base, a clamp arm attached to said inner sleeve and underlying said base, a flag supporting rod secured to said arm and said base, said rod extending upwardly through said inner sleeve, an outer sleeve slidably telescoped over said inner sleeve, an L-shaped clamp jaw carried by said outer sleeve adjacent its lower end, and means carried by said rod resiliently urging said sleeves towards each other.

2. A flagstaff holder for attachment to an automobile door comprising an inner sleeve having an enclosed base, a clamp arm attached to said inner sleeve and underlying said base, a flag supporting rod secured to said arm and said base, said rod extending upwardly through said inner sleeve, an outer sleeve slidably telescoped over said inner sleeve, an L-shaped clamp jaw carried by said outer sleeve adjacent its lower end, means carried by said rod resiliently urging said sleeves towards each other, said resilient urging means carried by said rod including a tension spring encircling said rod, one end of said spring being secured to said rod, the other end of said spring being secured to said outer sleeve.

3. A flagstaff holder for attachment to an automobile door comprising an inner sleeve having an enclosed base, a clamp arm attached to said inner sleeve and underlying said base, a flag supporting rod secured to said arm and said base, said rod extending upwardly through said inner sleeve, an outer sleeve slidably telescoped over said inner sleeve, an L-shaped clamp jaw carried by said outer sleeve adjacent its lower end, means carried by said rod resiliently urging said sleeves towards each other, said rod having a threaded lower end passing through said base, and a pair of nuts on said rod engaging opposite sides of said base for clamping said arm to said base.

4. A flagstaff holder comprising an inner sleeve having an enclosed base, a rod secured to said base and extending upwardly through said sleeve, an outer sleeve slidably telescoped on said inner sleeve, means yieldably slidably urging said sleeves towards each other, upper and lower clamp members secured to said outer and inner sleeves respectively, said upper clamp member including an L-shaped jaw, said L-shaped jaw including a U-shaped sleeve having a pair of spaced projecting arms, an elongated L-shaped jaw member extending between and secured to lower edges of said arms, that portion of the lower edges of said arms to which the L-shaped member is attached being upwardly offset whereby said jaw member is disposed above the lower end of said U-shaped sleeve, said U-shaped sleeve being disposed around said outer sleeve and secured thereto.

References Cited in the file of this patent

UNITED STATES PATENTS

| Number | Name | Date |
|---|---|---|
| 1,033,052 | Herrold | July 16, 1912 |
| 1,493,270 | Lees | May 6, 1924 |
| 1,587,181 | Pomeroy | June 1, 1926 |
| 1,741,136 | Naylor | Dec. 24, 1929 |
| 2,185,164 | Weinreb | Dec. 26, 1939 |
| 2,362,363 | Gardella | Nov. 7, 1944 |
| 2,524,461 | McDowell | Oct. 3, 1950 |

FOREIGN PATENTS

| Number | Country | Date |
|---|---|---|
| 656,826 | Germany | Feb. 18, 1938 |
| 736,565 | France | Nov. 25, 1932 |